No. 750,948. PATENTED FEB. 2, 1904.
F. P. COX.
DEMAND DISCOUNT METER.
APPLICATION FILED AUG. 15, 1902.
NO MODEL. 3 SHEETS—SHEET 1.
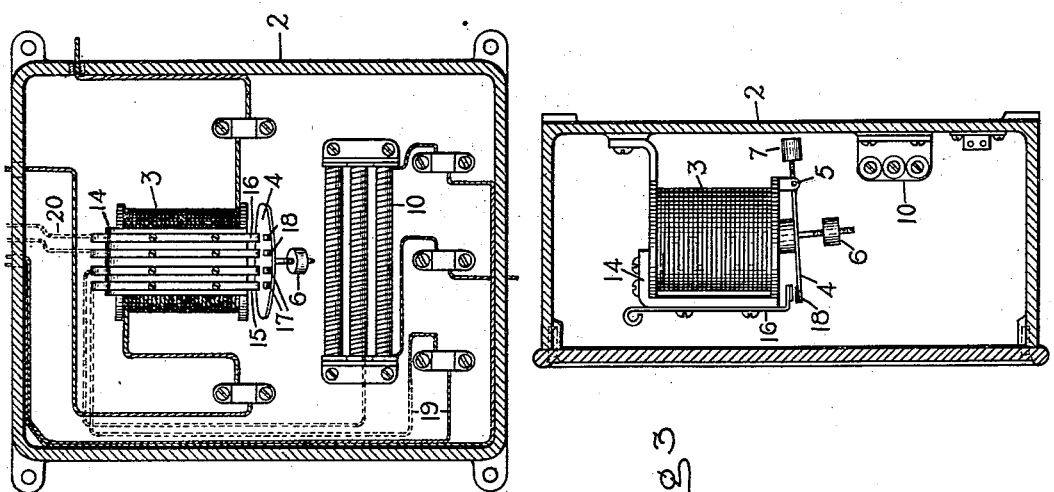
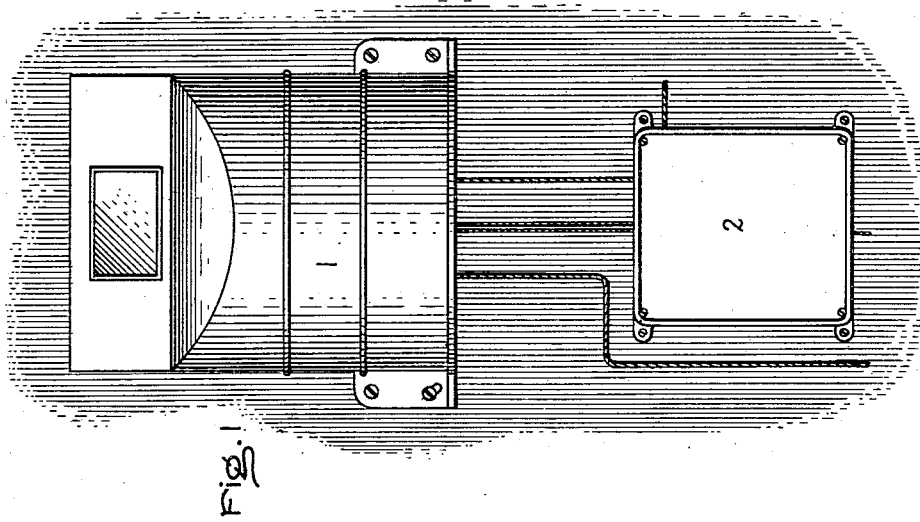
Witnesses:
George H. Tilden
Helen Orford
Inventor.
Frank P. Cox.
By Albert
Att'y.

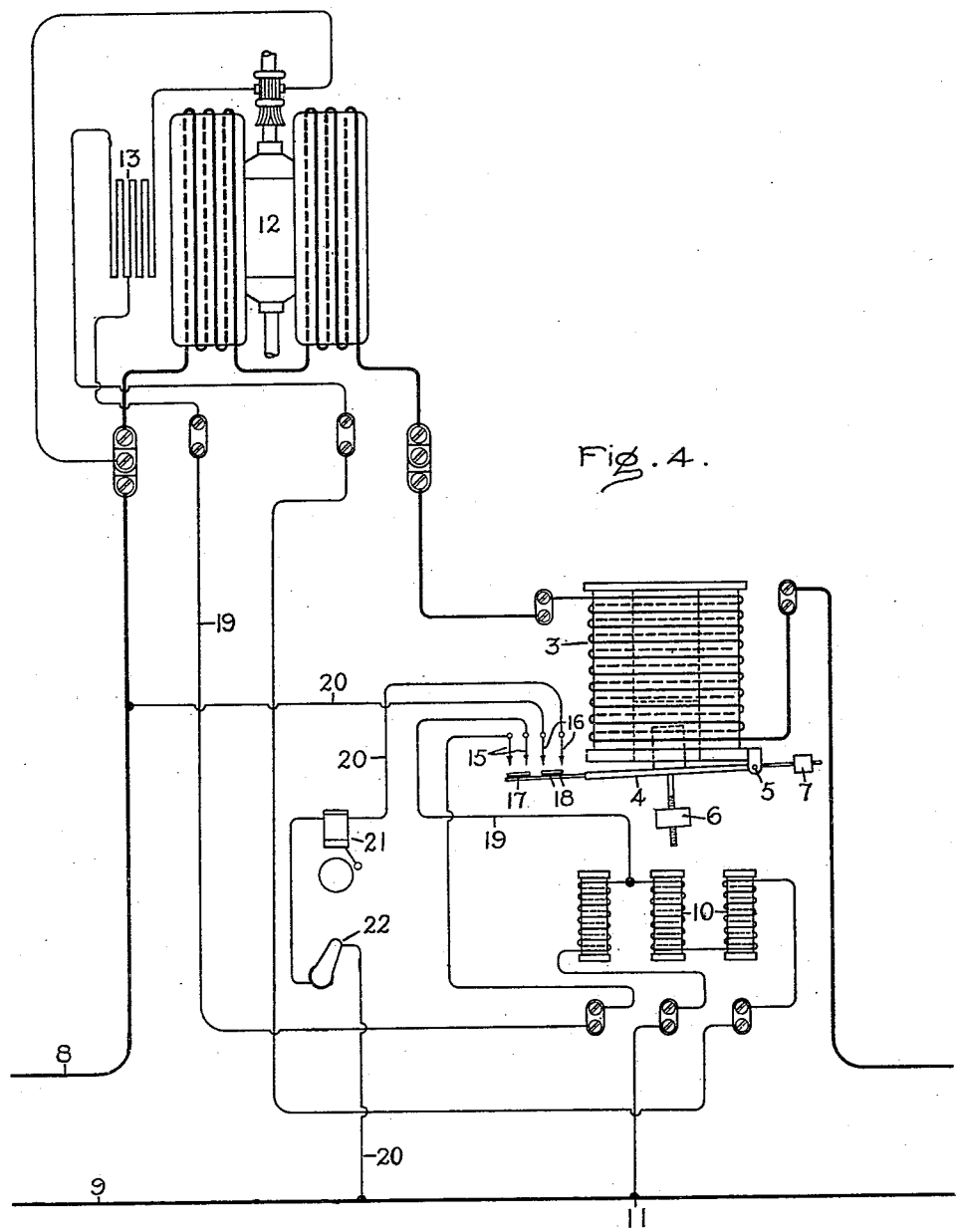

No. 750,948. PATENTED FEB. 2, 1904.
F. P. COX.
DEMAND DISCOUNT METER.
APPLICATION FILED AUG. 15, 1902.
NO MODEL. 3 SHEETS—SHEET 3.
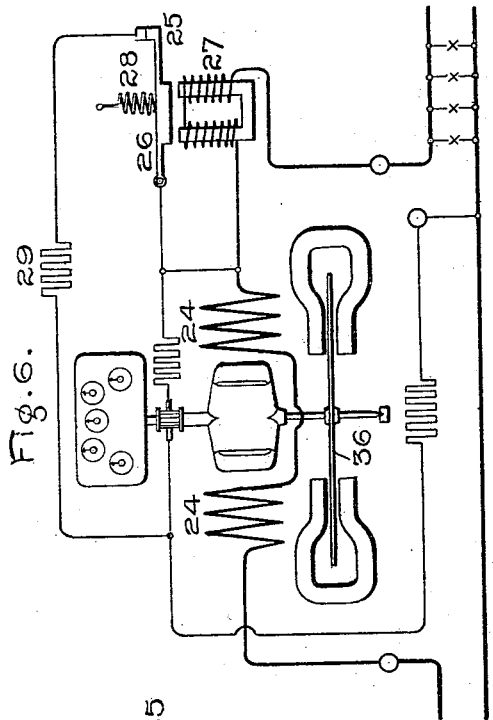
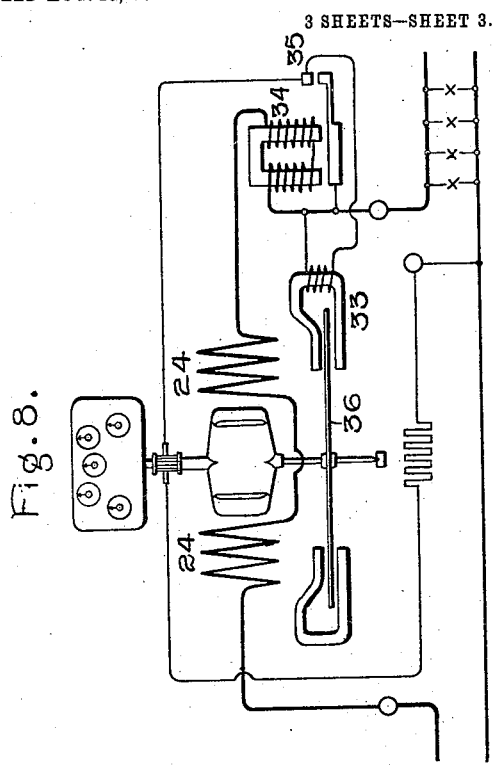
Witnesses:
Inventor:
Frank P. Cox,
by Albert G. Davis
Att'y.

No. 750,948.

Patented February 2, 1904.

UNITED STATES PATENT OFFICE.

FRANK P. COX, OF LYNN, MASSACHUSETTS, ASSIGNOR TO GENERAL ELECTRIC COMPANY, A CORPORATION OF NEW YORK.

DEMAND-DISCOUNT METER.

SPECIFICATION forming part of Letters Patent No. 750,948, dated February 2, 1904.

Application filed August 15, 1902. Serial No. 119,689. (No model.)

*To all whom it may concern:*

Be it known that I, FRANK P. COX, a citizen of the United States, residing at Lynn, in the county of Essex, State of Massachusetts, have invented certain new and useful Improvements in Demand-Discount Meters, of which the following is a specification.

This invention relates to electric meters; and its object is to provide a meter which will discourage any consumption of current above a predetermined maximum rate. Various schemes have been been proposed for accomplishing this result; but the one I have devised differs from all those with which I am acquainted.

In order that the invention may be fully understood, it should be stated that some electric power companies make a contract with the consumer for a certain maximum amount of energy per month or per annum, for which he makes a certain monthly or annual payment to cover his proportion of the fixed charges of the central station, after which energy is sold him at a predetermined discount from certain arbitrary station rates. The consumer may install as many lamps as he pleases; but so long as his rate of consumption remains inside of the contracted maximum as shown by the meter-reading he will be charged at the low rate agreed upon. Other companies give discounts to large users of current. It is very desirable, however, and indeed almost necessary, to have some check upon the consumer either to prevent his using temporarily more than the maximum current contracted for or to register all consumption in excess of a given amount.

My invention aims to permit an excess current to be used, but to notify the consumer in some way that he has exceeded the point up to which he gets a special discount. At the same time the meter is so arranged that when the contract maximum is exceeded it will register the total consumption at regular station rates. For instance, suppose the contract rate per one thousand watt-hours (twenty lamp-hours) is five cents and the regular station rate is ten cents. Then if a consumer whose maximum demand is twenty lamps burns all of them for one hour his meter will register one thousand watts; but if he turns on thirty lamps for one hour the consumption will be fifteen hundred watts, the charge for which at station rates would be fifteen cents. In order that the meter may properly indicate this, my invention consists in a meter arranged to run at a certain regularly-increasing speed up to a predetermined maximum of current, but so devised that beyond said limit the mechanism runs at a different speed, so that the registering-train will indicate either a consumption of current corresponding to the higher rate which is charged for the entire consumption when the contract maximum is exceeded or an apparently slower consumption where the discount is made for large consumption. As the consumer is charged for the amount registered, either mode of operation will properly indicate the amount he must pay. In order that the consumer may know when he is exceeding his contract, an alarm of some kind is arranged to be operated at such times.

In carrying my invention into practice I provide the meter with means for changing the torque of the meter for a given current or the drag for a given speed. In the accompanying drawings I have shown a variety of ways of accomplishing this.

Figure 1 is a front elevation of an electric meter having a resistance in series with the armature and an electromagnet in series with the series coils of the meter for cutting out said resistance when the current reaches a certain maximum. Fig. 2 is a front view of the electric switch and the resistance controlled thereby. Fig. 3 is a side elevation of the same, the inclosing casing being in section in both figures. Fig. 4 is a diagram of the circuits. Fig. 5 shows a shunt normally across the field-coils with means for opening it when the maximum contract current is exceeded. Fig. 6 shows a similar shunt across the armature. Fig. 7 shows a device for shunting part of the flux of the damping-magnets, and Fig. 8 means for cutting out a damping-electromagnet.

In Fig. 1 is shown at 1 the inclosing cover of a familiar type of electric meter, while below it at 2 is a box or casing containing my electric switch and the resistance controlled thereby. The switch comprises an electromagnet 3, (shown in Figs. 2, 3, and 4,) having an armature 4, which is pivoted at 5 and provided with adjustable weights 6 7 to enable it to be adjusted to respond to different current strength. The electromagnet is in series with one side, 8, of the line 8 9. A resistance 10 is connected with one side, 9, of the line at 11 and is in series with the armature 12 of the meter, which has the usual starting-coil 13, also in series therewith. Adjacent to the armature 4 and preferably supported by a piece 14, attached to the electromagnet, are a plurality of contacts 15 16. The armature carries insulated contacts 17 18, the former adapted to bridge the contacts 15 and the latter the contacts 16. Contacts 15 form part of a shunt 19 around more or less of the resistances 10 13. Contacts 16 form part of a circuit 20 across the line, including bell 21 or other alarm and a hand-switch 22.

When the current exceeds a certain predetermined amount as fixed by the adjustment of the weights 6 7, the electromagnet attracts its armature and closes the circuits 19 and 20. This cuts most of the resistance out of the armature-circuit of the meter and allows it to run at a much higher speed than usual. Furthermore, the alarm is started and continues to operate until the switch 22 is opened or the load on the meter is reduced below the maximum. In the latter case the electromagnet becomes too weak to retain its armature, which falls and opens the shunt-circuit 19, forcing the current for the meter-armature to flow through both resistances and reducing the speed of the meter to normal again.

In Fig. 5 a resistance-shunt 23 is thrown across the field-coils 24, said shunt including the contacts 25, one of which is carried on the pivoted armature 26 of an electromagnet 27 in series with the instrument. A spring 28 holds the contacts normally closed. When the current reaches a predetermined value, the electromagnet overcomes the spring and opens the shunt, causing the whole current to flow through the field-coils and drive the meter at normal speed, whereas it previously ran at a low speed and gave a discount registration as long as the contacts 25 remain closed.

In Fig. 6 there is a resistance-shunt 29 across the armature-circuit, so that the meter runs normally at less than the correct speed. When, however, the current reaches a predetermined value and the electromagnet 27 opens the shunt, the meter runs at normal speed.

In Fig. 7 a piece of iron 30 is carried by the pivoted armature of the series electromagnet 31 near the poles of a permanent damping-magnet 32. A spring 32 opposes the attraction of the electromagnet 31; but as the current becomes stronger the iron piece is brought nearer the poles of the drag-magnet, shunts a portion of the damping-flux, and the meter speeds up. This gives a sort of sliding discount, since the position of the iron piece varies with the current.

In Fig. 8 one of the drag-magnets is an electromagnet 33, whose winding is normally included in the potential circuit. At a predetermined value of current the series electromagnet 34 closes the contacts 35 and short-circuits the electromagnet 33. This increases the speed of the meter not only by decreasing the drag on the disk 36, but by increasing the torque, since the resistance of the armature-circuit is diminished by the cutting out of the electromagnet 33.

By simply reversing the action of the series electromagnets 27, 31, and 34 the speed of the meter will be reduced instead of increased when said magnets operate.

It will be seen that this invention does not interfere with the use of power by the consumer, so that he is not subjected to the annoyance of having his lights cut off or caused to flicker, as with some devices heretofore proposed; but he is warned by the alarm that he is exceeding his contract maximum, and he knows that so long as he continues to do so his meter will register in such a way as to make him pay accordingly. The device does not have to be reset or unlocked, since merely cutting down the load to the normal automatically restores the resistance to the meter-circuit.

What I claim as new, and desire to secure by Letters Patent of the United States, is—

1. The combination with an electric meter, of means for changing the speed of said meter so long as the line-current exceeds a predetermined maximum.

2. The combination with an electric meter, of means for altering the resistance of one of the meter-circuits so long as the line-current exceeds a predetermined maximum.

3. The combination with an electric meter, of a shunt around one of the elements of said meter, and an electromagnet in series with the line for controlling said shunt continuously during a predetermined overload.

4. The combination with an electric meter, of a resistance in the armature-circuit, and means for shunting said resistance continuously when the line-current exceeds a predetermined maximum.

5. The combination with an electric meter, of a given resistance in the armature-circuit, and a switch responsive to an excess of line-current for cutting out a portion of said resistance continuously during a predetermined current variation.

6. The combination with an electric meter, of a given resistance in one of the meter-circuits, an electromagnet in series with the line, and a shunt around said resistance controlled continuously during a predetermined overload by the armature of said electromagnet.

7. The combination with an electric meter, of a given resistance in the armature-circuit, an electromagnet in series with the line, an armature for said magnet provided with adjustable counterbalance-weights, and a shunt around a portion of said resistance controlled by the armature of said electromagnet.

8. The combination with an electric meter, of a given resistance in the armature-circuit, an electromagnet in series with the line, an armature for said magnet provided with contacts, a shunt around said resistance, and an alarm-circuit across the line, each containing contacts adapted to be bridged by the contacts on the armature of the electromagnet.

In witness whereof I have hereunto set my hand this 11th day of August, 1902.

FRANK P. COX.

Witnesses:
DUGALD McK. McKILLOP,
JOHN A. McMANUS.